(12) United States Patent
Ootani et al.

(10) Patent No.: US 8,351,025 B2
(45) Date of Patent: Jan. 8, 2013

(54) TARGET AND THREE-DIMENSIONAL-SHAPE MEASUREMENT DEVICE USING THE SAME

(75) Inventors: Hitoshi Ootani, Itabashi-ku (JP); Tadayuki Ito, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 885 days.

(21) Appl. No.: 12/379,670

(22) Filed: Feb. 26, 2009

(65) Prior Publication Data
US 2009/0220145 A1 Sep. 3, 2009

(30) Foreign Application Priority Data

Feb. 28, 2008 (JP) ................................. 2008-047039

(51) Int. Cl.
*G01C 3/08* (2006.01)
(52) U.S. Cl. ........ 356/3.01; 356/3.1; 356/4.01; 356/4.1; 382/154
(58) Field of Classification Search .......... 356/3.01–3.1, 356/4.01–4.1, 5.01–5.15, 6–22; 382/154
See application file for complete search history.

(56) References Cited

U.S. PATENT DOCUMENTS

| 6,804,380 | B1 | 10/2004 | Ioannou et al. |
| 2002/0042900 | A1* | 4/2002 | Schachner et al. ............ 714/795 |
| 2004/0051711 | A1* | 3/2004 | Dimsdale et al. ............. 345/419 |
| 2005/0099637 | A1* | 5/2005 | Kacyra et al. ................ 356/601 |
| 2006/0269124 | A1* | 11/2006 | Harada et al. ................. 382/154 |
| 2007/0091174 | A1* | 4/2007 | Kochi et al. ................... 348/135 |
| 2008/0123110 | A1* | 5/2008 | Dickinson et al. ............ 356/620 |
| 2009/0148037 | A1* | 6/2009 | Moriyama et al. ............ 382/154 |
| 2009/0251680 | A1* | 10/2009 | Farsaie ............................. 356/3 |
| 2010/0256940 | A1* | 10/2010 | Ogawa et al. ................... 702/97 |

\* cited by examiner

*Primary Examiner* — Luke Ratcliffe
(74) *Attorney, Agent, or Firm* — Wenderoth, Lind & Ponack, L.L.P.

(57) ABSTRACT

A target set in a to-be-measured object and used for acquiring a reference value of point-cloud data, the target includes a small circle surrounded by a frame and having the center of the target, a large circle surrounded by the frame and disposed concentrically with the small circle so as to surround the small circle, a low-luminance reflective region located between the frame and the large circle and having the lowest reflectivity, a high-luminance reflective region located between the large circle and the small circle and having the highest reflectivity, and an intermediate-luminance reflective region located inside the small circle and having an intermediate reflectivity which is higher than the reflectivity of the low-luminance reflective region and which is lower than the reflectivity of the high-luminance reflective region.

11 Claims, 14 Drawing Sheets

TARGET AND THREE-DIMENSIONAL-SHAPE MEASUREMENT DEVICE USING THE SAME

PRIORITY CLAIM

The present application is based on and claims priority from Japanese Patent Application No. 2008-047039, field on Feb. 28, 2008, the disclosure of which is hereby incorporated by reference in its entirety.

BACKGROUND OF THE INVENTION

1. Field of the Invention

The present invention relates to a target used for measuring the three-dimensional shape of an object to be measured, and also to a three-dimensional-shape measurement device using the target.

2. Description of the Related Art

A laser scanner is a well-known example of three-dimensional-shape measurement device used for acquiring, in a short period of time, data on the three-dimensional shape (3-D data) of an object to be measured (hereinafter also referred to as "to-be-measured object").

FIG. 1 illustrates an example of measuring a to-be-measured object by a laser scanner. FIG. 1 shows a to-be-measured object 100 (e.g. a building as a physical structure). For acquiring data on the three-dimensional shape of the to-be-measured object 100, a laser scanner 101 is set, for example, at a reference point R1, scans a scan area E1, and acquires point-cloud data for the scan area $E_1$.

Then, the laser scanner 101 is set, for example, at a reference point R2, scans, for example, a scan area $E_2$, and acquires point-cloud data for the scan area $E_2$. As has been described above, scan areas are appropriately set depending on the three-dimensional shape of the to-be-measured object 100, and the laser scanner 101 acquires point-cloud data for each scan area by scanning repeatedly a number of times as many as the scan areas. Here, the scan areas of the to-be-measured object 100 overlap one another, and targets 103 for the measurement of three-dimensional shape are placed in each overlapped portion. The point-cloud data for all the scan areas are combined on the basis of reference points defined by the target 103, and thus data on the three-dimensional shape of the to-be-measured object 100 is acquired. The three-dimensional shape data thus acquired sometimes are converted into the public survey coordinates.

For the purpose of acquiring the coordinates of the center as a reference point, the target 103 used together with the laser scanner 101 is configured, as shown in FIG. 2, such that: a circular central region 103a has the highest reflectivity; a circular peripheral region 103b surrounding the circular central region 103a has the lowest reflectivity; and a reflective region 103d located between a rectangular frame 103c and the circular peripheral region 103b has an intermediate reflectivity.

Incidentally, it is known that the target 103 may be also configured such that: the reflective region 103d located between the rectangular frame 103c and the circular peripheral region 103b has the highest reflectivity; the circular peripheral region 103b has the lowest reflectivity; and the circular central region 103a has the intermediate reflectivity (reference to U.S. Pat. No. 6,804,380B1, for example).

SUMMARY OF THE INVENTION

A possible use of the three-dimensional data thus acquired by the laser scanner is to combine the data with an image acquired by, for example, a digital camera, by means of texture mapping or the like. The combining of the three-dimensional data with the image involves: acquiring, by the laser scanner, the three-dimensional coordinates of the centers of the respective targets 103 set in the to-be-measured object 100; and acquiring the image coordinates corresponding to the centers of the targets 103 from the image data corresponding to the three-dimensional data.

To put it differently, when the digital camera is used, a circular target is used to acquire the accurate image coordinates corresponding to the center of each target in accordance with, for example, the moment method. When the laser scanner is used, on the other hand, the accurate three-dimensional coordinates of the center of each target has to be acquired from the point-cloud data acquired by the scanning of the targets.

An object of the present invention is therefore providing a target suitable for both cases where a reference position is detected through the laser scanning by a three-dimensional-shape measurement device and where a reference position is detected from data on a taken image.

A first aspect of the present invention provides a target set in a to-be-measured object and used for acquiring a reference value of point-cloud data with the following characteristic features. The target includes: a small circle surrounded by a frame and having the center of the target; a large circle surrounded by the frame and disposed concentrically with the small circle so as to surround the small circle; a low-luminance reflective region located between the frame and the large circle and having the lowest reflectivity; a high-luminance reflective region located between the large circle and the small circle and having the highest reflectivity; and an intermediate-luminance reflective region located inside the small circle and having an intermediate reflectivity which is higher than the reflectivity of the low-luminance reflective region and which is lower than the reflectivity of the high-luminance reflective region.

It is preferable that a mark having a reflectivity that is approximately the same as the reflectivity of the low-luminance reflective region be formed at the center of the target inside the small circle.

It is preferable that a mark having a reflectivity that is approximately the same as the reflectivity of the intermediate-luminance reflective region be formed at the center of each side of the frame.

It is preferable that the intermediate-luminance reflective region be used for ranging.

A second aspect of the present invention provides a three-dimensional-shape measurement apparatus with the following characteristic features. The three-dimensional-shape measurement apparatus includes: a light-emitting unit emitting a pulse-laser beam towards a to-be-measured object provided with the target according to the first aspect; a first drive unit scanning the to-be-measured object in a horizontal direction; a second drive unit scanning the to-be-measured object in a vertical direction; an image light-receiving unit taking an image of the to-be-measured object; and a controller. The controller calculates the coordinates of the center of the target according to the first aspect and thus the distance between the three-dimensional-shape measurement apparatus and the target by the scanning in the horizontal and vertical directions. The controller calculates the three-dimensional coordinates of the center of the target according to the first aspect. In addition, the controller carries out processing of combining point-cloud data acquired by scanning the to-be-measured object, on the basis of the calculated three-dimensional coordinates of the center position of the target. The controller carries out: a target-searching process step of scanning a searching area of the to-be-measured object with the pulse-laser beam, and searching for the target according to the first aspect on the basis of point-cloud data including a reflected laser beam obtained from each point of the to-be-measured object and a reflected laser beam obtained from each point of the target according to the first aspect; a capturing process step of specifying a target searching area on the basis of the point-cloud data acquired at the target-searching process step, and capturing an approximate position of the target on the basis of point-cloud data acquired by scanning the specified target searching area; a detailed searching process step of performing in-detail searching of the target on the basis of the approximate position of the target acquired in the capturing process step, and acquiring point-cloud data; a center-coordinate determination process step of extracting an edge between a high-luminance reflective region and a low-luminance reflective region of the target according to the first aspect on the basis of the intensity of a reflected laser beam of the point-cloud data acquired in the detailed searching process step, and obtaining the coordinates of the center of the target by an ellipsoidal-approximation process; and a ranging process step of measuring the distance between the three-dimensional-shape measurement apparatus and the target.

It is preferable that the controller set a plurality of threshold levels for the intensity of the reflected laser beam of the point-cloud data acquired in the detailed searching process step. It is also preferable that the controller determine the coordinates of the center of the target by using, among sets of center coordinates of a plurality of ellipsoids obtained by carrying out ellipsoidal approximation process for each of the threshold levels, a set of center coordinates having a small deviation.

It is preferable that the controller acquire the point-cloud data in the capturing process step by attenuating, by a predetermined proportion, the reflected laser beam coming from the to-be-measured object, and then by carrying out the capturing process step again.

It is preferable that the controller acquire the point-cloud data in the capturing process step by measuring the distance between the three-dimensional-shape measurement apparatus and the target, and then by carrying out the capturing process step while the controller changes the beam-spot diameter of the pulse-laser beam on the basis of the distance-measurement result.

It is preferable that the controller extract the edge by scanning the point-cloud data in a vertical direction.

It is preferable that the controller check whether or not the would-be target acquired by the in-detail searching is a true target by comparing the size of the would-be target with that of the target having been registered beforehand.

It is preferable that a plurality of the targets to be used having different sizes be prepared in accordance with the distance between three-dimensional-shape measurement apparatus and the to-be-measured object.

It is also preferable that, on the basis of an image obtained by the image light-receiving unit and the three-dimensional coordinates obtained from the point-cloud data, the controller position a center position of the image and a center position of the point-cloud data so that the center positions can coincide with each other.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENT

A description will be given below as to a target that is used for measuring the three-dimensional shape and a three-dimensional-shape measurement device that uses the target, according to an embodiment of the present invention.
[Embodiment]
[General Configuration of Device]

To begin with, a description will be given below as to a three-dimensional-shape measurement device according to the embodiment of the present invention.

Figure 3:
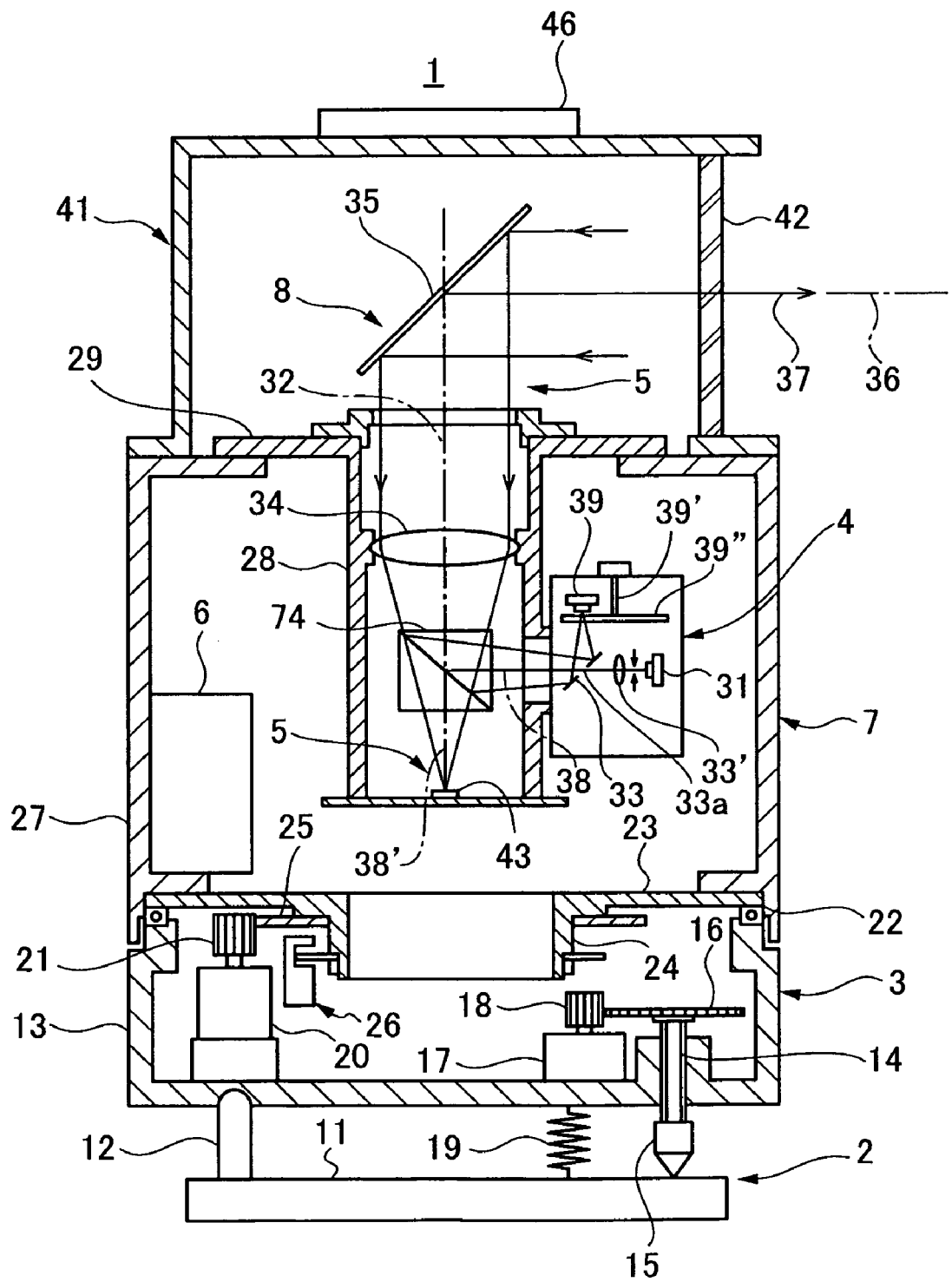
FIG. 3 is a sectional view illustrating schematically the structure of a three-dimensional-shape measurement device according to an embodiment of the present invention.
Figure 4:
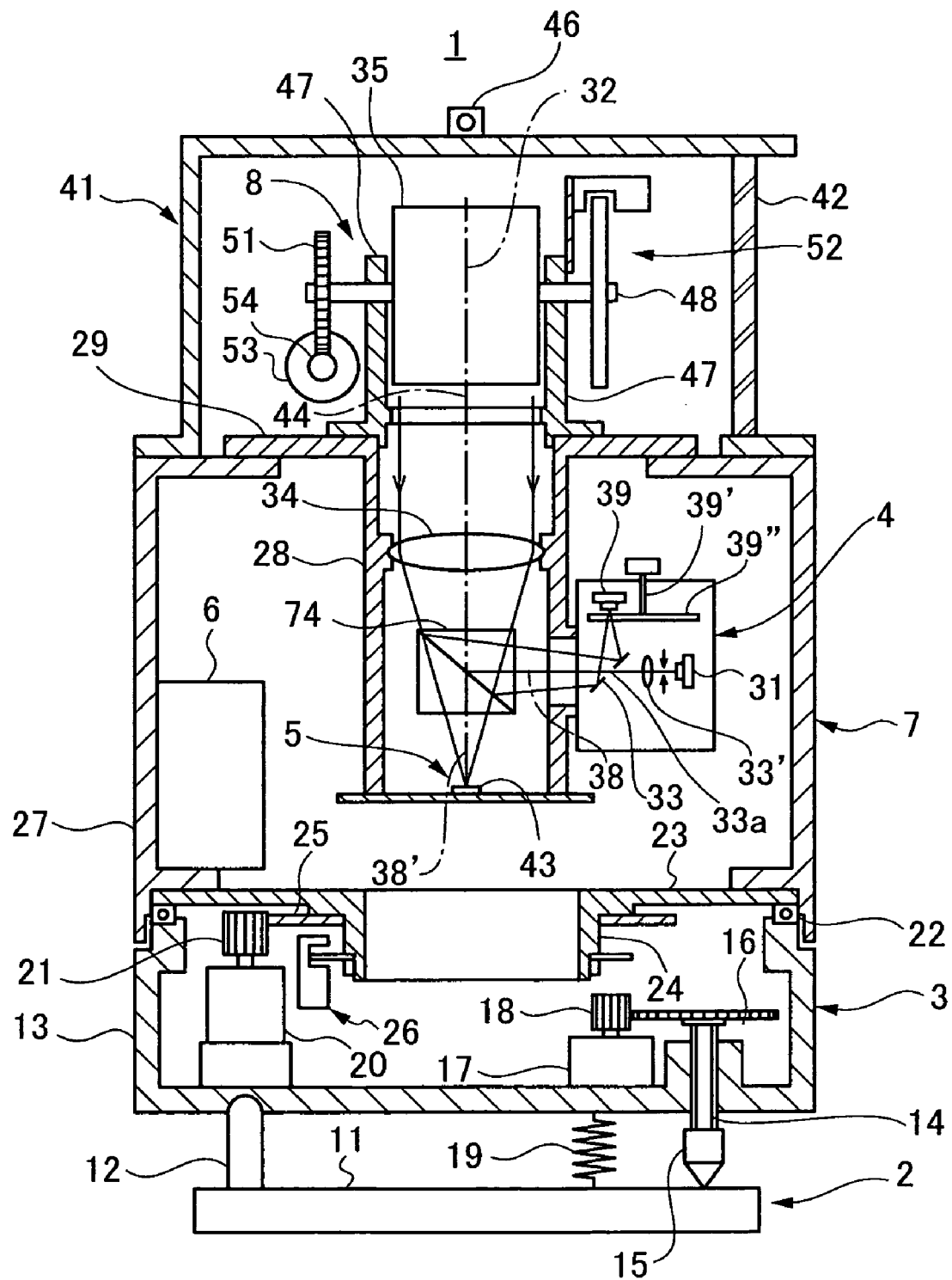
FIG. 4 is a sectional view for explaining the structure of a rotational illuminator shown in FIG. 3.

FIGS. 3 and 4 are sectional views each illustrating a three-dimensional-shape measurement device according to the embodiment of the present invention. In FIGS. 3 and 4, a three-dimensional-shape measurement device is denoted by the reference numeral 1. The three-dimensional-shape measurement device 1 mainly includes: a leveling unit 2; a rotational mechanism 3 disposed in the leveling unit 2; a measurement-device main body 7 supported by the rotational mechanism 3 and including a ranging unit 4, an imager 5, a controller 6, and the like; a rotational illuminator 8 disposed in an upper portion of the measurement-device main body 7. Note that FIG. 4 illustrates the sectional view seen from the same direction as that of FIG. 3 except that only the rotational illuminator 8 is seen from the left-hand side of FIG. 3 for simplifying the explanation.

[Configuration of Leveling Unit 2]

The leveling unit 2 includes a weighing table 11 and a lower casing 13. A pin 12 stands on top of the weighing table 11. The upper-end portion of the pin 12 is formed into a curved surface. The upper-end portion of the pin 12 is fitted into a recessed portion formed in the bottom surface of the lower casing 13 so as to allow the lower casing 13 to incline freely. Adjustment screws 14 are screwed into and penetrate the lower casing 13 at two positions that are different from the position of the pin 12. A leg member 15 is fixed to the lower-end portion of each of the adjustment screws 14. The lower end of the leg member 15 is formed into either a sharp tip end or a curved surface, and is in contact with the weighing table 11. A leveling driven gear 16 is fitted to the upper-end portion of the adjustment screw 14. The lower casing 13 is thus supported by the weighing table 11 at three points, that is, by the pin 12 and the two adjustment screws 14. The lower casing 13 can incline with a fulcrum at the leading end of the pin 12. Note that a tension spring 19 is provided between the weighing table 11 and the lower casing 13 so as to prevent the weighing table 11 and the lower casing 13 from moving away from each other.

Two leveling motors 17 are disposed inside the lower casing 13. A leveling drive gear 18 is fitted to the output shaft of each of the leveling motors 17. The leveling drive gears 18 mesh with the leveling driven gears 16, respectively. The two leveling motors 17 are driven by the controller 6 independently of each other. Driving the leveling motors 17 rotates the respective adjustment screws 14 via the corresponding leveling drive gears 18 and leveling driven gears 16. The amount by which each of the adjustment screws 14 protrudes downwards is thereby adjusted. In addition, an inclination sensor 56 (see FIG. 5) is disposed inside the lower casing 13. The two leveling motors 17 are driven on the basis of the detection signals of the inclination sensor 56, and thus the leveling is carried out.

[Configuration of Rotational Mechanism 3]

The lower casing 13 also serves as a casing of the rotational mechanism 3. A horizontal-turn motor 20 is disposed inside the lower casing 13. A horizontal-turn drive gear 21 is fitted to the output shaft of the horizontal-turn motor 20. A rotational platform 23 is disposed in the upper portion of the lower casing 13 with a bearing member 22 is set in between. A rotational shaft portion 24 is formed in the central portion of the rotational platform 23 so as to stick downwards. A horizontal-turn gear 25 is provided on the rotational shaft portion 24. The horizontal-turn drive gear 21 meshes with the horizontal-turn gear 25.

A horizontal-angle detector 26, such as an encoder, is provided to the rotational shaft portion 24. The horizontal-angle detector 26 detects a relative rotational angle of the rotational shaft portion 24 with respect to the lower casing 13. The relative rotational angle (horizontal angle) thus detected is inputted into the controller 6, and the controller 6 controls the horizontal-turn motor 20 on the basis of the detection results.

[Configuration of Measurement-Apparatus Main Body 7]

The measurement-apparatus main body 7 includes a main-body casing 27. The main-body casing 27 is fixed to the rotational platform 23. A lens barrel 28 is disposed inside the main-body casing 27. The lens barrel 28 is disposed so that its rotational axis may coincide with that of the main-body casing 27. In addition, the rotational axis of the lens barrel 28 coincides also with an optical axis 32 of the lens barrel 28. Note that various ways of attaching the lens barrel 28 to the main-body casing 27 are conceivable. For example, a flange portion 29 is formed in the upper-end portion of the lens barrel 28, and is screwed to the ceiling portion of the main-body casing 27. A beam splitter 74 serving as a light-beam splitting unit is disposed inside the lens barrel 28. The beam splitter 74 functions to allow transmission of visible light and to reflect infrared light. The beam splitter 74 splits the optical axis 32 into an optical axis 38 and another optical axis 38'.

The ranging unit 4 is provided on the outer-circumferential portion of the lens barrel 28, and includes a pulse-laser light source 31. A holed mirror 33, a beam-waist changing optical system 33' changing the beam-waist diameter of laser beam are disposed between the pulse-laser light source 31 and the beam splitter 74. The pulse-laser light source 31, the beam-waist changing optical system 33', and the holed mirror 33 form a ranging light-source unit. The optical axis of the ranging light-source unit coincides with the optical axis 38. The holed mirror 33 functions to guide a pulse-laser beam to the beam splitter 74 by allowing the pulse-laser beam to pass through its hole portion 33a; and to reflect a laser beam toward ranging light-receiving unit 39 upon receipt of the laser beam firstly reflected by a target to be described later to return to the beam splitter 74, and then reflected by the beam splitter 74. The beam-waist changing optical system 33' functions to change a beam-waist diameter of laser beam, and includes a convex lens and an aperture diaphragm. Alternatively, the beam-waist changing optical system 33' may include a convex lens and a concave lens, or may include plural convex lenses with focal distances different from one another.

The pulse-laser light source 31 includes, for example, a semiconductor laser. The pulse-laser light source 31 emits, by the control of the controller 6, infrared pulse-laser beam at predetermined timings. The infrared pulse-laser beam thus emitted passes through the beam-waist changing optical system 33' and then through the hole portion 33a of the holed mirror 33, and is then introduced to the beam splitter 74. The infrared pulse-laser beam is then reflected by the beam splitter 74 towards a site-angle turn mirror 35. The site-angle turn mirror 35 functions to reflect the infrared pulse-laser beam thus emitted from the pulse-laser light source 31 towards the to-be-measured object 100 (see FIG. 1). The site-angle turn mirror 35 also functions to convert the vertically-extending optical axis 32 into a light-projecting optical axis 36 that extends horizontally. Inside the lens barrel 38, a condensing lens 34 is disposed between the beam splitter 74 and the site-angle turn mirror 35.

The reflected laser beam that returns back from the target, which will be described in detail later, is introduced to the ranging light-receiving unit 39 via the site-angle turn mirror 35, the condensing lens 34, the beam splitter 74, and the holed mirror 33. Note that a reference light beam is also introduced to the ranging light-receiving unit 39 via an internal reference-light-beam passage. The distance between the three-dimensional-shape measurement apparatus 1 and the to-be-measured object 100 is measured on the basis of the difference between the time required for the ranging light-receiving unit 39 to receive the reflected laser beam and the time required for the ranging light-receiving unit 39 to receive the reference light beam that has passed through the internal reference-light-beam passage.

To enhance the range accuracy between the three-dimensional-shape measurement apparatus 1 and the to-be-measured object 100, the ranging unit 4 is equipped with an attenuator 39' that is disposed between the holed mirror 33 and the ranging light-receiving unit 39. An attenuator with a known configuration can be used as the attenuator 39'. For example, the attenuator 39' includes: a turret platform 39''; and plural filters which have different densities from one another and which are disposed in the outer-peripheral portion of the turret platform 39'' so as to be arranged, at appropriate intervals, in the circumferential direction of the turret platform 39''. This attenuator 39' helps to reduce measurement errors attributable to saturation of the amount of the reflected light beam.

The imager 5 is disposed in the lens barrel 28 at a side opposite to the condensing lens 34 with the beam splitter 74 located in between. The imager 5 includes an image light-receiving unit 43 disposed on the bottom portion of the lens barrel 28. The image light-receiving unit 43 includes multiple pixels that are collectively arranged in a flat-plane shape. A CCD is an example of the image light-receiving unit 43. The positions of the pixels of the image light-receiving unit 43 are specified by the optical axis 38'. For example, an X-Y coordinate system is assumed with the position of the optical axis 38' defined as the origin. Thus, the position of each of the pixels can be defined as a point within this X-Y coordinate system.

[Configuration of Rotational Illuminator 8]

A light-projecting casing 41 is disposed on top of the main-body casing 27. A light-projecting window 42 is formed in a portion of a circumferential wall of the light-projecting casing 41. The rotational illuminator 8 is housed in the light-projecting casing 41. As FIG. 4 shows, a pair of mirror-holder plates 47 is provided on top of the flange portion 29 so as to face each other. A turning shaft 48 penetrates the mirror-holder plates 47, and the site-angle turn mirror 35 is fixed to the turning shaft 48. A site-angle gear 51 is fitted to one end portion of the turning shaft 48. A site-angle detector 52 is fitted to the other end portion of the turning shaft 48. The site-angle detector 52 detects the angle by which the site-angle turn mirror 35 is turned, and then outputs the detection results to the controller 6.

A site-angle drive motor 53 is attached to one of the mirror-holder plates 47. A drive gear 54 is fitted to the output shaft of the site-angle drive motor 53. The drive gear 54 meshes with the site-angle gear 51. The site-angle drive motor 53 is driven appropriately by the controller 6 that controls the site-angle drive motor 53 on the basis of the detection results of the site-angle detector 52.

A sight 46 including a fore-sight and a rear-sight is disposed on top of the light-projecting casing 41. The sight 46 is used for approximately setting a sight at the target. The direction of the sight setting by the sight 46 is a direction perpendicular to that in which an optical axis 37 or the turning shaft 48 extends.

[Circuit Configuration of Controller 6]

Figure 5:
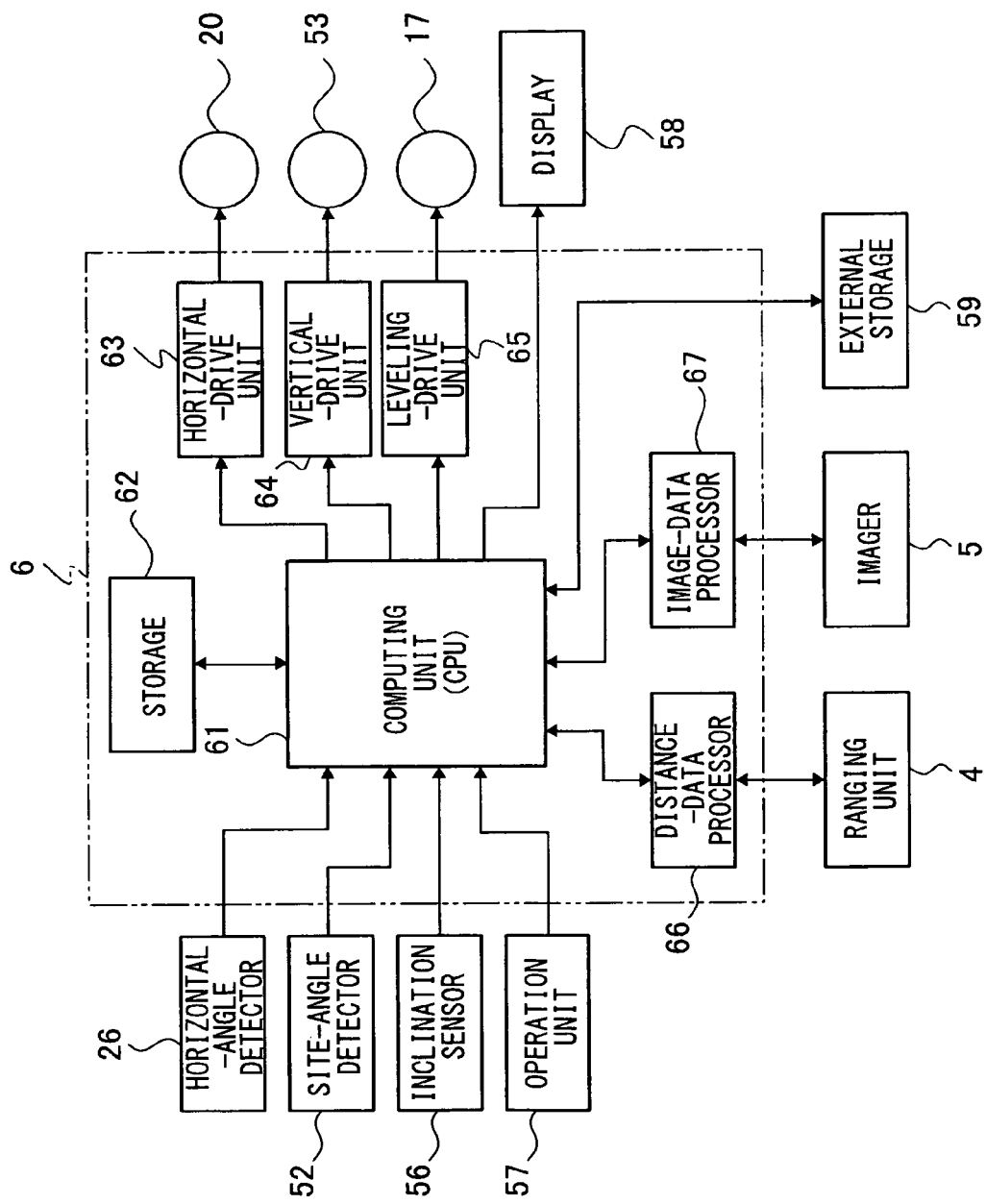
FIG. 5 is a block diagram illustrating a controller shown in FIG. 3.

As FIG. 5 shows, the detection signals of the horizontal-angle detector 26, the site-angle detector 52, and the inclination sensor 56 are inputted into the controller 6. In addition, operation-instructing signals of an operation unit 57 are also inputted into the controller 6. An operator operates the operation unit 57 so as to input, into the controller 6, the necessary conditions for the three-dimensional-shape measurement apparatus 1 to start the measurement and other instructions. Note that the operation unit 57 may be provided inside the main-body casing 27. In an alternative configuration, the operation unit 57 may be provided as an independent body from the main-body casing 27, and the instructions to remotely control the controller 6 may be transmitted to the controller 6 by a signal-transmitting medium, which may either be wired or wireless. The controller 6 drives and controls the horizontal-turn motor 20, the site-angle drive motor 53, and the leveling motors 17. The controller also drives and controls a display 58 that displays the status of the operation and the measurement results, and the like. An external storage 59, such as a memory card or an HDD, is provided in the controller 6 so as to be detachable from the controller 6.

The controller 6 includes a computing unit 61 including a CPU, a storage 62, a horizontal-drive unit 63, a vertical-drive unit 64, a leveling-drive unit 65, a distance-data processor 66, an image-data processor 67, and the like. The storage 62 stores therein various programs including: a sequence program necessary for ranging the distance, for detecting the angle of site, and for detecting the horizontal angle; a computing program; a measurement data processing program to execute the processing of the measurement data; an image processing program to execute image processing; programs such as an image displaying program to make the display 58 display the data; an integrated administration program to integrally administer the above-mentioned various programs; and various data, such as measurement data and image data. The horizontal-drive unit 63 drives and controls the horizontal-turn motor 20. The vertical-drive unit 64 drives and controls the site-angle drive motor 53. The leveling-drive unit 65 drives and controls the leveling motors 17. The distance-data processor 66 processes the distance data acquired by the ranging unit 4. The image-data processor 67 processes the image data acquired by the imager.

[Configuration of Target]

Figure 6:
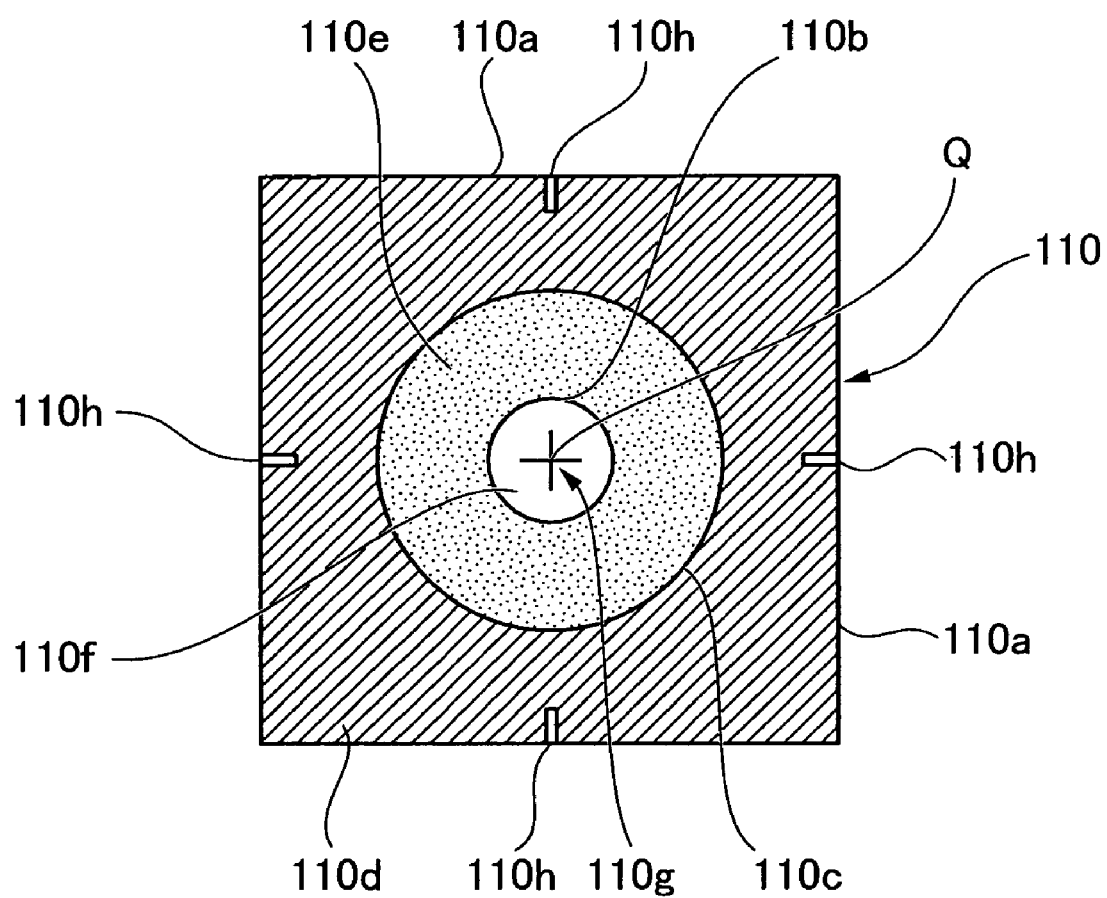
FIG. 6 is a principal-portion plan view of an example of the target according to an embodiment of the present invention.

FIG. 6 is a plan view illustrating a principal portion of a target for three-dimensional-shape measurement. In FIG. 6, a target for three-dimensional-shape measurement is denoted by the reference numeral 110. The target 110 includes a rectangular frame 110a located on its outermost side. A small circle 110b is drawn while the intersection Q of the two diagonals of the rectangular frame 110a set as the center of the small circle 110b. A large circle 110c is drawn so as to surround the small circle 110b. The center of the large circle 110c coincides with the center of the small circle 110b. The rectangular frame 110a surrounds the large circle 110c. The reflective region located between the large circle 110c and the rectangular frame 110a is a low-luminance reflective region 110d that has the lowest reflectivity. The color of the low-luminance reflective region 110d is, for example, black.

The circular peripheral region located between the small circle 110b and the large circle 110c is a high-luminance reflective region 110e that has the highest reflectivity. The high-luminance reflective region 110e is made, for example, of a reflective material, that is, a material that shines when lighted by an infrared pulse-laser beam.

The circular central region surrounded by the small circle 110b is an intermediate-luminance reflective region 110f that has an intermediate reflectivity, that is, a reflectivity between the low reflectivity of the low-luminance reflective region 110d and the high reflectivity of the high-luminance reflective region 110e. The color of the intermediate-luminance reflective region 110f is, for example, white. A cross-shaped mark 110g is formed at the center of the intermediate-luminance reflective region 110f. The reflectivity of the cross-shaped mark 110g is approximately the same as the reflectivity of the low-luminance reflective region 110d. The color of the cross-shaped mark 110g is, for example, black.

A mark 110h is formed at the middle point of each side of the rectangular frame 110a. The reflectivity of each of the marks 110h is approximately the same as the reflectivity of the intermediate-luminance reflective region 110f. The color of the marks 110h is, for example, white. The cross-shaped mark 110g is used to almost squarely set a sight at the target. The marks 110h, on the other hand, are used to obliquely set a sight at the target.

The relative reflectivity levels of these regions are, for example, determined as follows. If the reflectivity level of the low-luminance reflective region 110d is assumed to be "1," the reflectivity level of the intermediate-luminance reflective region 110f is "100" and the reflectivity level of the high-luminance reflective region 110e is "1000."

When the target 110 is used, the target 110 is fixed to the to-be-measured object 100. Even when the to-be-measured object 100 has a highly reflective portion, the great difference in the reflectivity between the low-luminance reflective region 110d and the high-luminance reflective region 110e enables the high-luminance reflective region 110e to be extracted easily. The intermediate-luminance reflective region 110f is used when the ranging is carried out. The intermediate-luminance reflective region 110f functions to prevent the saturation of the reflected light for ranging.

[Methods of Searching for Target 110]

The methods of acquiring approximate position of the target 110 are as follows. a) In a first method, a sight is directly set at the target 110 by the sight 46. b) In a second method, the area within which the target 110 is searched for is set; then approximate searching for the target 110 is performed by an infrared pulse-laser beam; and then using the search data acquired by the approximate searching, the approximate position of the target 110 is specified. c) In a third method, the area within which the target 110 is searched for is set; then the image of the inside of the searching area is taken; on the basis of the image data thus taken, the approximate position of the target 110 is specified.

Figure 7:
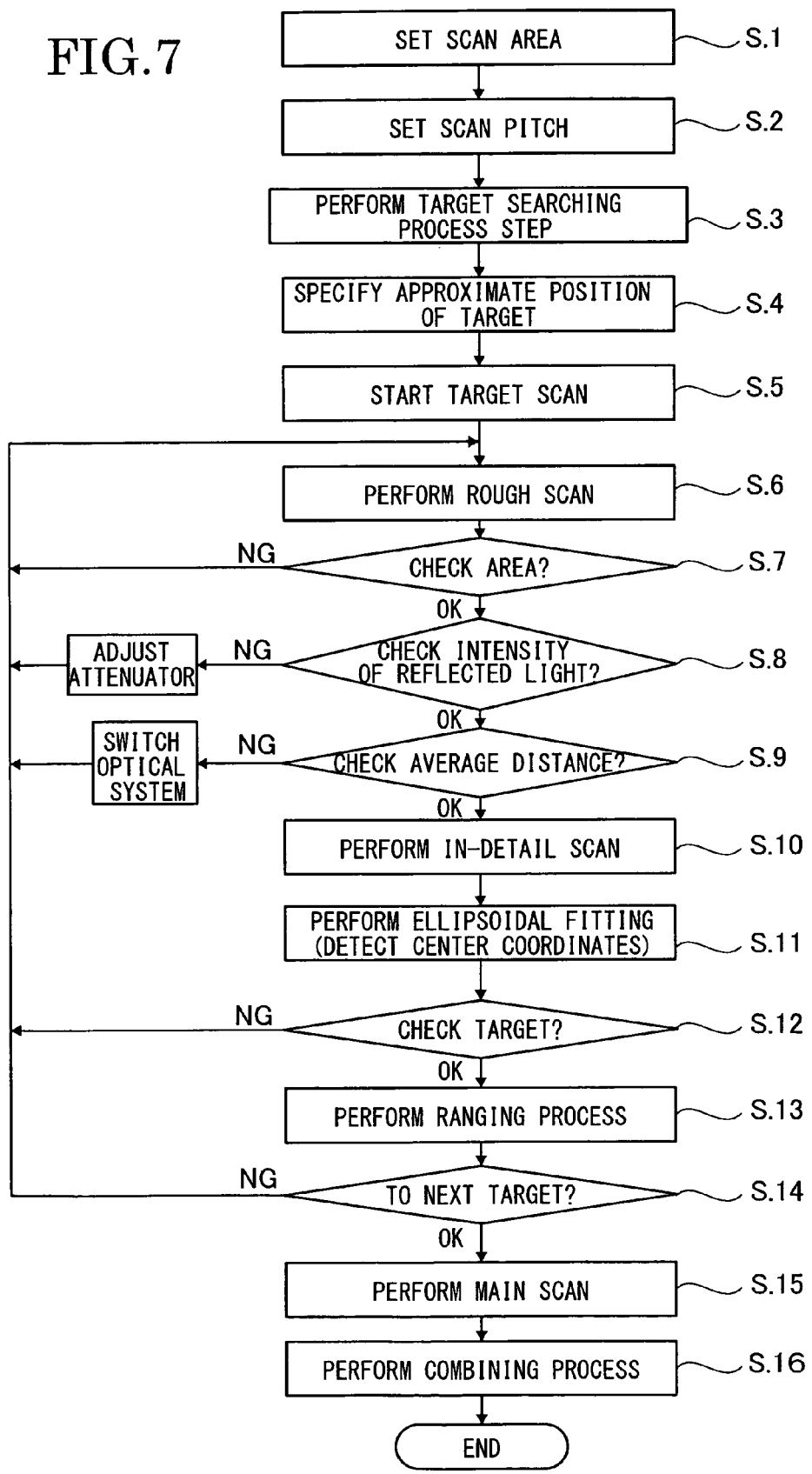
FIG. 7 is a flowchart illustrating the processing performed by the three-dimensional-shape measurement apparatus according to an embodiment of the present invention.

The three-dimensional-shape measurement apparatus 1 can acquire the approximate position of the target 110 by any one of the above-mentioned methods. Here, the case of using the method b) will be described below with reference to the flowchart shown in FIG. 7.

Step S.1 (Setting Target-Searching Area)

Figure 1:
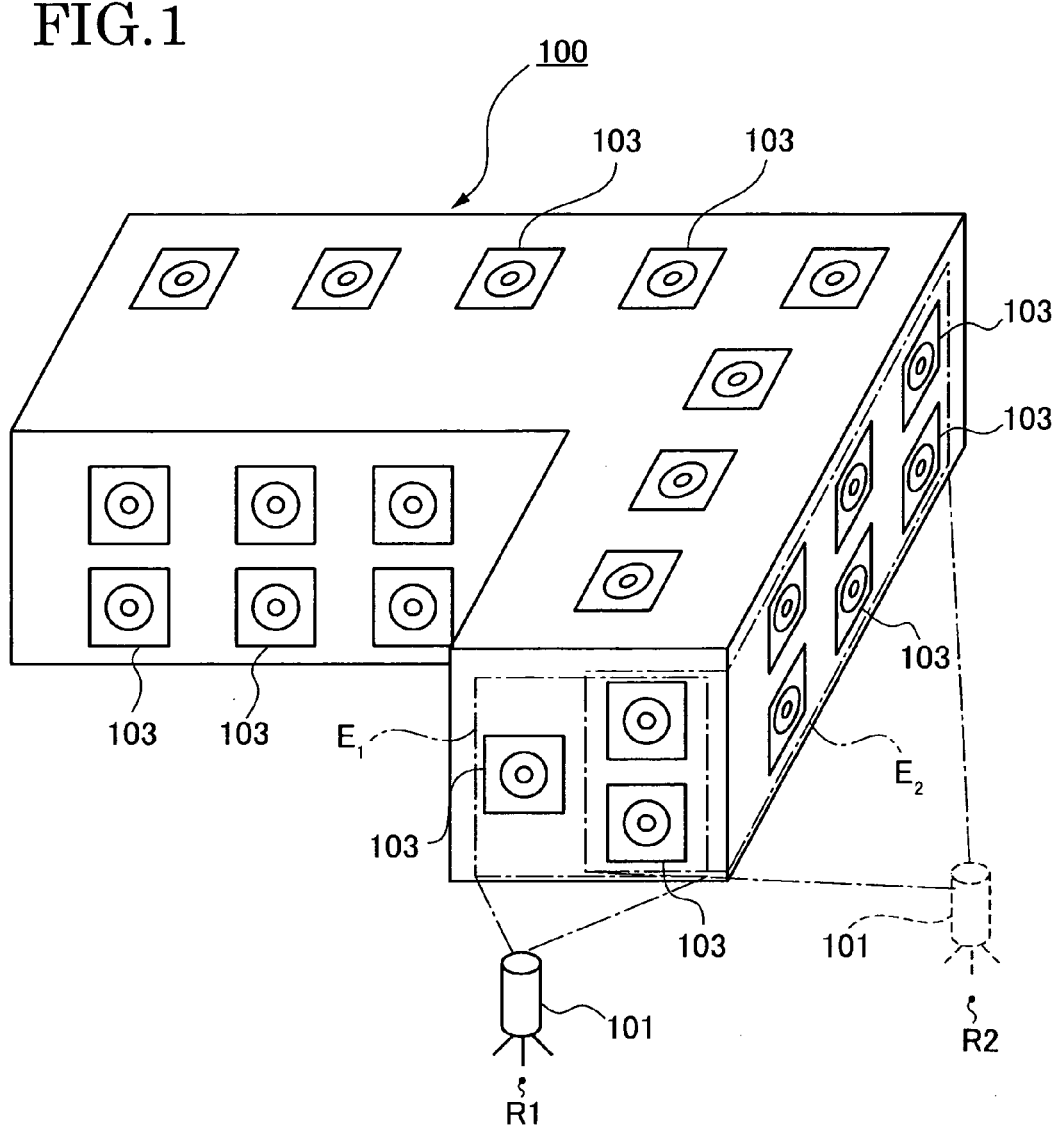
FIG. 1 is a schematic view illustrating an example of a method for measuring a to-be-measured object by a laser scanner.
Figure 2:
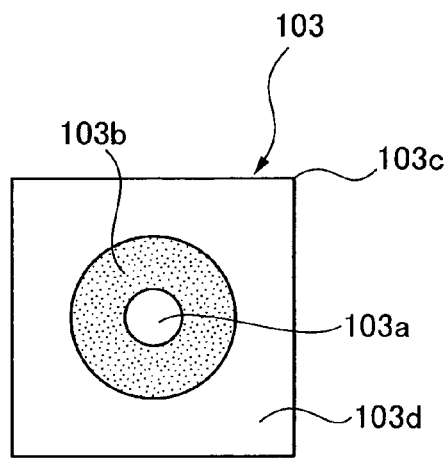
FIG. 2 is a plan view of an example of a target set in the to-be-measured object shown in FIG. 1.

For the sake of explanatory convenience, FIG. 1 is referenced and assume that the targets 110 of the present invention is set in the to-be-measured object 100 instead of the conventional targets 103 shown in FIG. 1.

A searching area is specified by the operation unit 57, such as a mouse. For example, the searing area E1 of FIG. 1 is specified.

Step S.2 (Setting Scan Pitch)

Scan pitches for the searching is specified by the operation unit 57. Specifically, the scan pitch is specified both in the horizontal and vertical directions. Each of the scan pitches is determined in accordance with the distance between the three-dimensional-shape measurement apparatus 1 and the target 110 to be searched for. When the pitches are set, the beam-waist diameter of the infrared pulse-laser beam has to be taken into consideration.

Step S.3 (Carrying Out Target Searching)

Target searching is carried out by scanning, with the infrared pulse-laser beam, the searching area specified at step S.1. When the target searching is carried out, a series of scanning, firstly in the vertical direction and then in the horizontal direction is repeatedly carried out.

The scanning in the vertical direction is carried out by turning the site-angle turn mirror 35. The scanning in the horizontal direction is carried out by turning the main-body casing 27 in the horizontal direction. The infrared pulse-laser beam is shot out thousands or tens of thousands of times per second. The infrared pulse-laser beam thus shot out is reflected off every point of the to-be-measured object 100, and returns back to the three-dimensional-shape measurement apparatus 1. The infrared pulse-laser beam thus reflected off every point of the to-be-measured object 100 (hereafter, simply referred to as the reflected light) is received by the ranging light-receiving unit 39. The ranging light-receiving unit 39 outputs its received-light output to the controller 6. Since the angle of site of the site-angle turn mirror 35 is obtained by the site-angle detector 52 and the horizontal angle of the main-body casing 27 is obtained by the horizontal-angle detector 26, the set of the horizontal angle and the angle of site can be associated with the received-light output of the ranging light-receiving unit 39 on a one-to-one basis. The controller 6 creates point-cloud data corresponding to the intensity of the reflected light on the basis of the received-light output sent from the ranging light-receiving unit 39.

Figure 8:
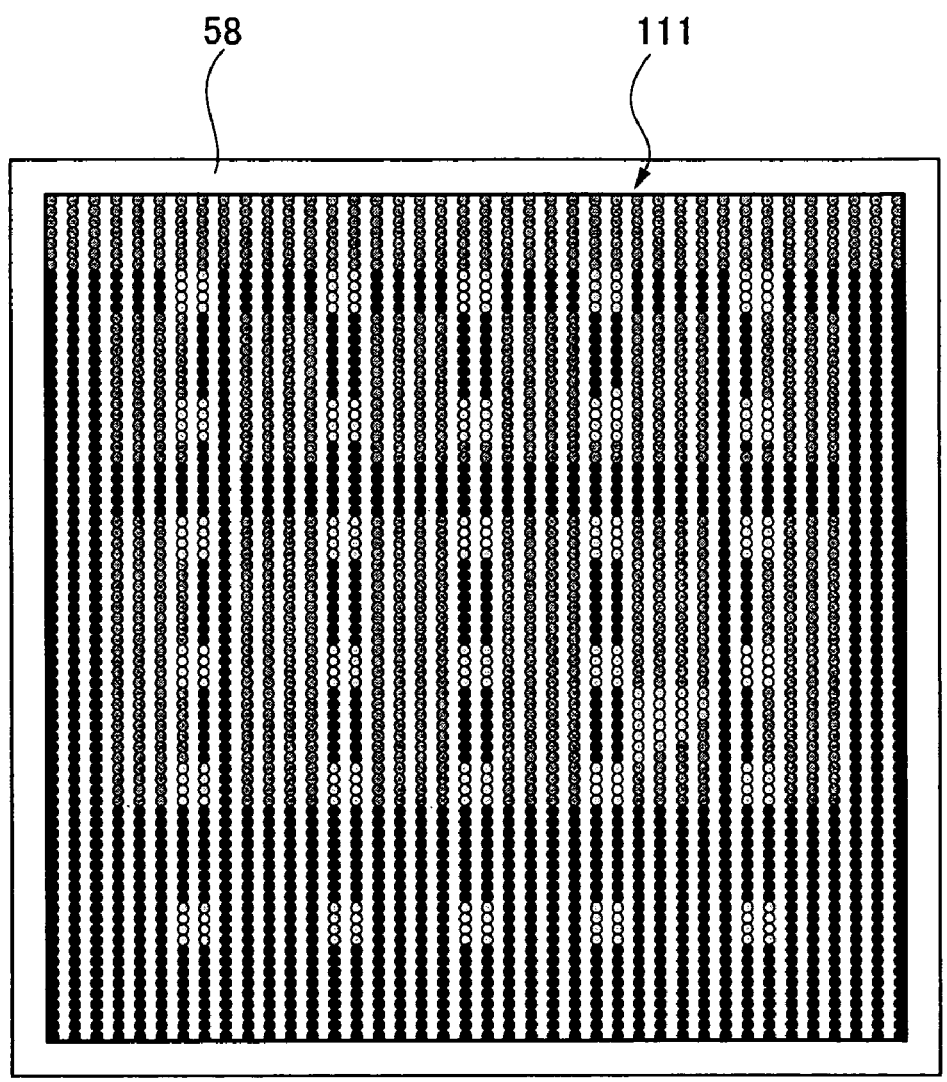
FIG. 8 is a diagram illustrating a state where point-cloud data acquired in a target-searching process is displayed on a screen of a display.

As FIG. 8 shows, various colors are given to the point-cloud data in accordance with the intensity of the reflected light, and then the colored point-cloud data is displayed on the screen of the display 58. For example, the points with the highest intensity of the reflected light are marked by red (by white in FIG. 8, for the sake of explanatory convenience); the points with the lowest intensity of the reflected light are marked by blue (by black in FIG. 9, for the sake of explanatory convenience); the points with an intermediate intensity of the reflected light—that is, with an intensity between the intensity of the highest-intensity points and the intensity of the lowest-intensity point—are marked by yellow (in FIG. 8, by grey which is an intermediate color between white and black, for the sake of explanatory convenience). Note that a black frame 111 shown in FIG. 8 represents the searching area for the target 110.

Step S.4 (Specifying Approximate Center Positions of Targets 110)

Figure 9:
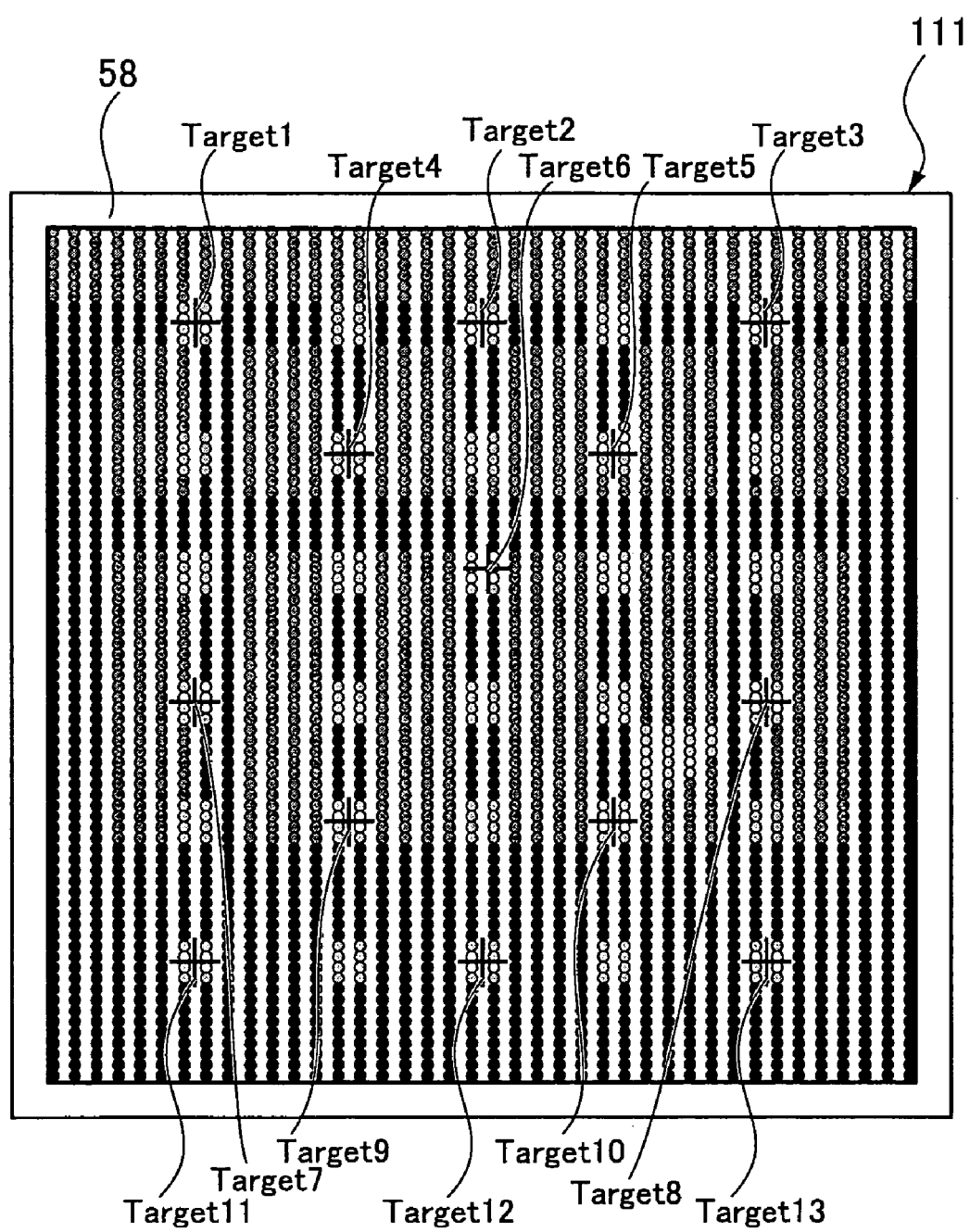
FIG. 9 is a diagram illustrating a state where approximate positions of the targets are specified.

Subsequently, as FIG. 9 shows, approximate center positions of the target 110 are specified by the operation unit 57, for example, by moving, with a mouse, the cursor to positions at each of which the intensity of the reflected light is the highest. The approximate center positions are specified for plural targets 110. In the case shown in FIG. 9, the approximate center positions of thirteen targets 110 are specified, and sequential serial numbers are given to the targets 110 in an order of earlier specification (Target 1, Target 2, . . . , Target 13).

Step S.5 (Starting Target Scanning)

Subsequently, the target scanning is started by operating the operation unit 57.

Step S.6 (Carrying Out Rough Target Scanning: Target Capturing Processing)

Rough target scanning is carried out, for example, in an order of earlier specification of the targets 110. To scan the vicinity of the approximate center position of each of the specified targets 110, the controller 6 makes the site-angle turn mirror 35 turn at a minute angular pitch. The pitch of the horizontally-turning angle is the same as the pitch at the time of carrying out the target searching.

Figure 10:
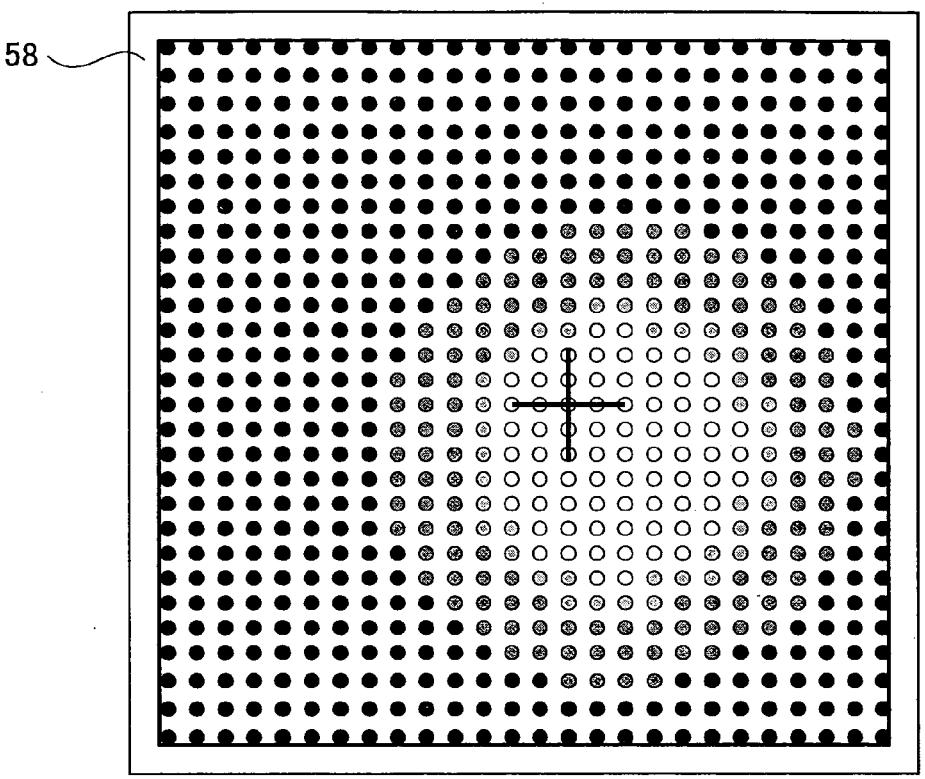
FIG. 10 is a diagram illustrating an example of point-cloud data acquired in a process of searching in the vicinity of Target 1 shown in FIG. 9.

FIG. 10 shows point-cloud data acquired by carrying out the rough target scanning at Step S.6. FIG. 10 shows a state where the center position of the target 110 is offset from the approximate center position of the specified target 110.

Step S.7 (Checking Target Scanning Area: Target Capturing Processing)

Figure 11:
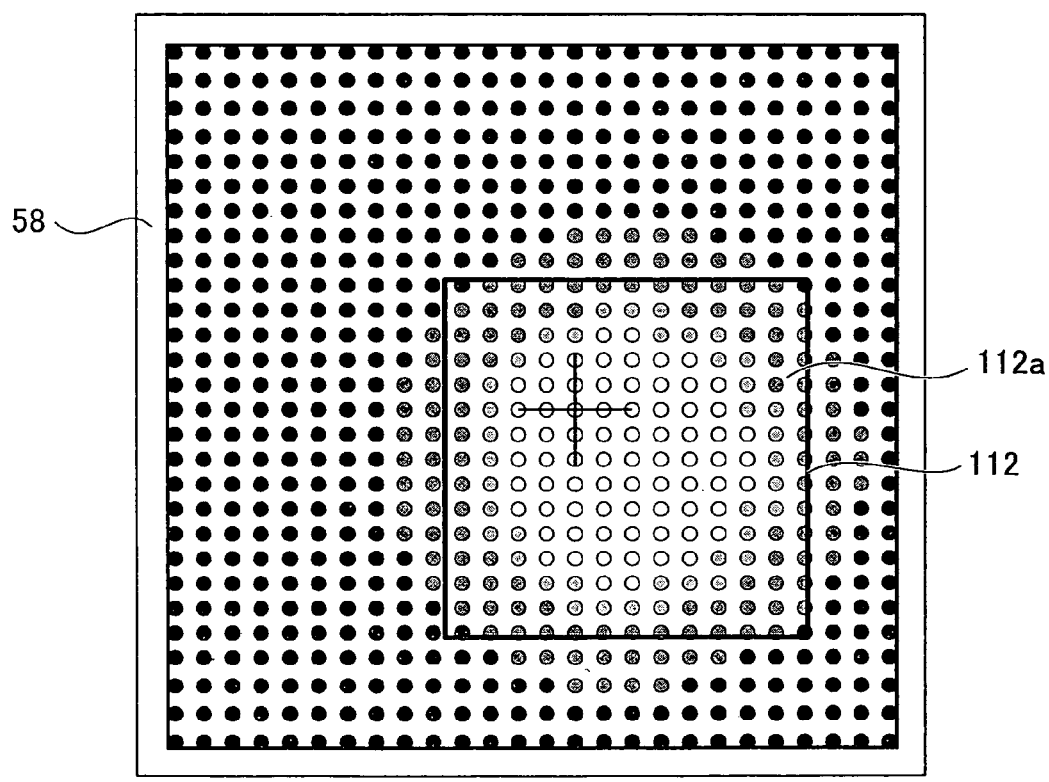
FIG. 11 is a diagram illustrating an example of target scanning area determined on the basis of the point-cloud data shown in FIG. 10.

Subsequently, the controller 6 sets a threshold value that is 50% of the values of the reflected-light intensity for all the acquired point-cloud data. The controller 6 extracts, from all the point-cloud data acquired at Step S. 6, the point-cloud data with values of the reflected-light intensity that are equal to or higher than the threshold value (50%). The controller 6 thus calculates a rectangular region including point-cloud data with values of the reflected-light intensity equal to or higher than the threshold value (50%). For example, a rectangular region 112a including point-cloud data with values of reflected-light intensity equal to or higher than the threshold value (50%) is obtained as FIG. 11 shows. In FIG. 11, a black frame 112 represents the contour of the rectangular region 112a.

Figure 12:
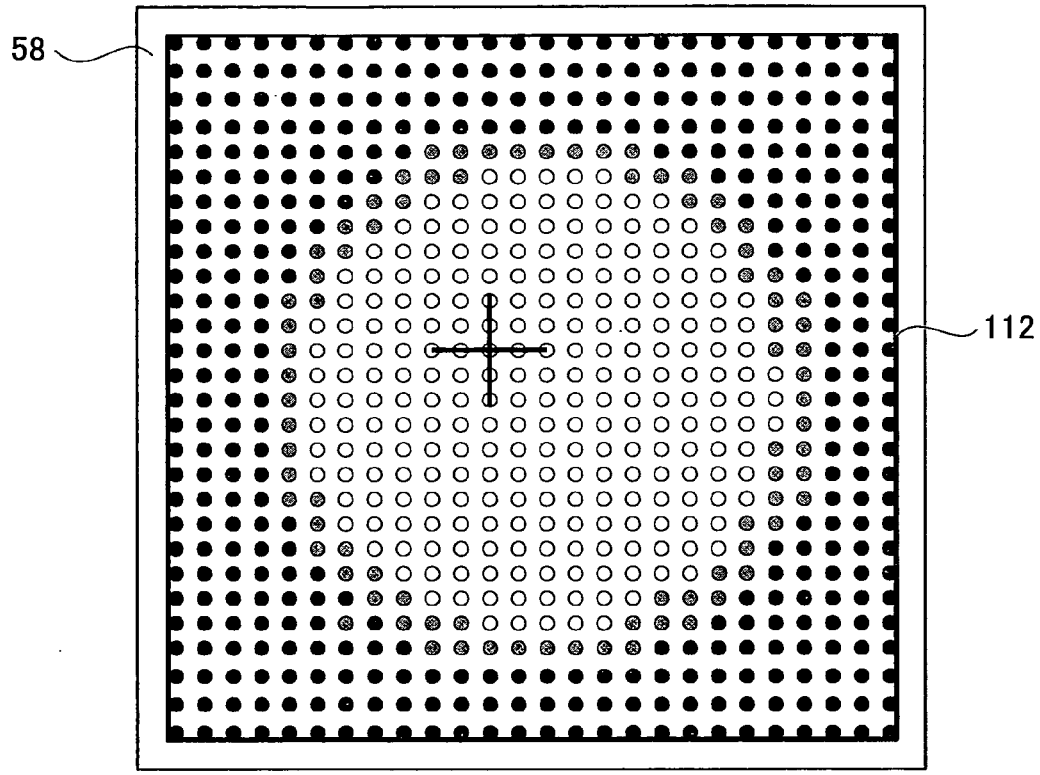
FIG. 12 is a diagram illustrating an example of point-cloud data acquired in a process of searching the target scanning area shown in FIG. 11.
Figure 13:
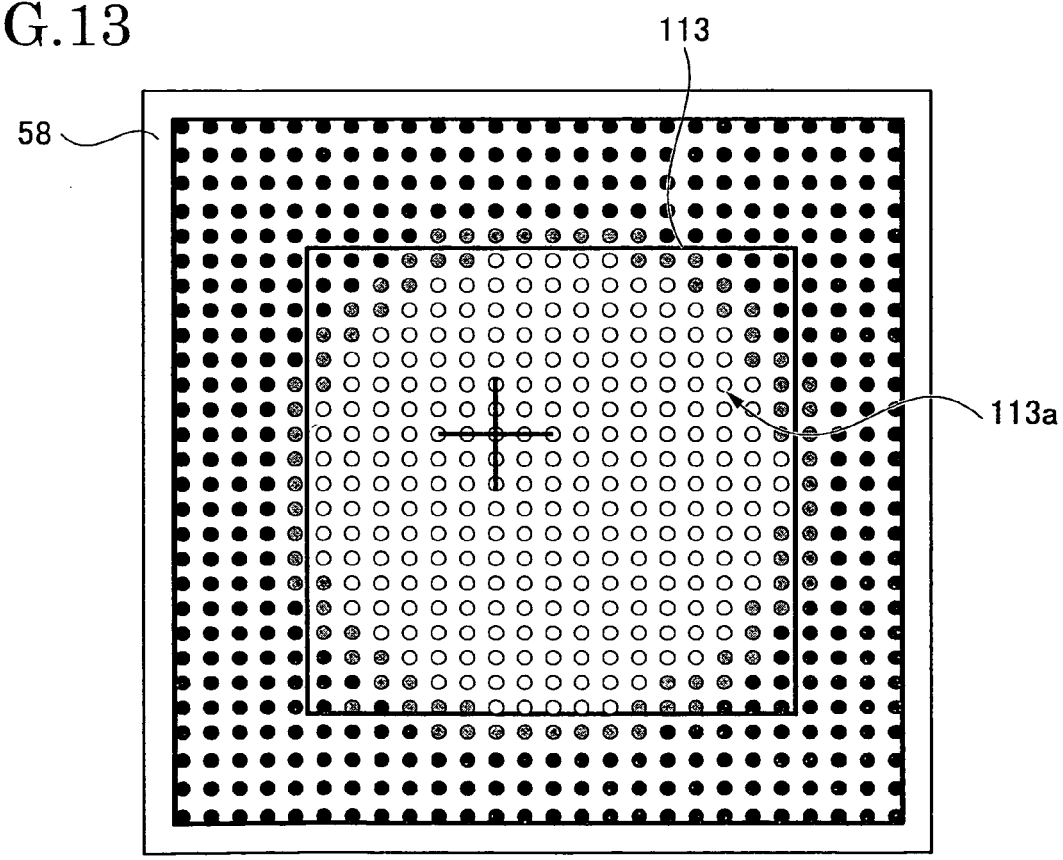
FIG. 13 is a diagram illustrating an example of the target scanning area determined on the basis of the point-cloud data shown in FIG. 12.

Then, the controller 6 returns back to Step S. 6, and carries out another rough target scanning over the inside of the black frame 112 that is specified so as to be a narrower area than the area scanned in the previous rough target scanning. As a result, point-cloud data shown in FIG. 12 is obtained. Subsequently, the controller 6 sets another threshold value that is 50% of the values of the reflected-light intensity for all the point-cloud data acquired in this second rough target scanning. The controller 6 then extracts, from all the point-cloud data shown in FIG. 12, the point-cloud data with values of the reflected-light intensity equal to or higher than the new threshold value (50%). The controller 6 thus calculates a rectangular region 113a including point-cloud data with values of reflected-light intensity equal to or higher than the new threshold value (50%). In this way, the rectangular region 113a including point-cloud data with values of reflected-light intensity equal to or higher than the new threshold value (50%) is obtained as FIG. 13 shows. In FIG. 13, a reference numeral 113 represents the contour of the rectangular region 113a. Repeating this processing, the rectangular region 113a including point-cloud data with values of reflected-light intensity equal to or higher than the threshold value (50%) converges on a constant state and no changes occur in the area covered by the rectangular region 113a. As a consequence, the controller 6 determines that the narrowing down of the target 110 has been finished, and then proceeds to Step S.8. Note that the criterion for determining whether or not there still is a change in the areas covered by the rectangular region 113a can be set appropriately.

Step S.8 (Checking Value of Reflected-Light Intensity: Target Capturing Processing)

Subsequently, the controller 6 determines whether or not the maximum value of the reflected-light intensity for the point-cloud data is high enough to be detected by the three-dimensional-shape measurement apparatus, namely, whether or not the maximum value of the reflected-light intensity for the point-cloud data is the saturation level or higher (whether halation occurs or not). When the maximum value of the reflected-light intensity for the point-cloud data is equal to or higher than the saturation level, the controller 6 drives the attenuator 39', and attenuates the level of the amount of the light received by the ranging light-receiving unit 39. Then, the controller 6 returns back to Step S. 6, and proceeds to carry out the processing of Step S.6 and then the processing of Step S.7.

Step S. 9 (Checking Average Distance: Target Capturing Processing)

When the controller 6 determines that the maximum value of the reflected-light intensity for the point-cloud data is below the saturation level, the average distance between the three-dimensional-shape measurement apparatus 1 and the target 110 is calculated by using the black region of the target 110 and the region surrounding the black region (i.e., the portion located in the roughly scanned area and having a low reflected-light intensity). On the basis of the average distance thus calculated, the controller 6 drives and controls the beam-waist changing optical system 33', and sets the beam-waist changing optical system 33' so as to make the infrared pulse-laser beam have an appropriate diameter. Subsequently, the controller 6 carries out another processing of Step S. 6 or another processing of Step S. 9. As a consequence, the target 110 is captured appropriately by the three-dimensional-shape measurement apparatus 1.

Step S.10 (Processing of In-Detail Target Scanning)

Figure 14:
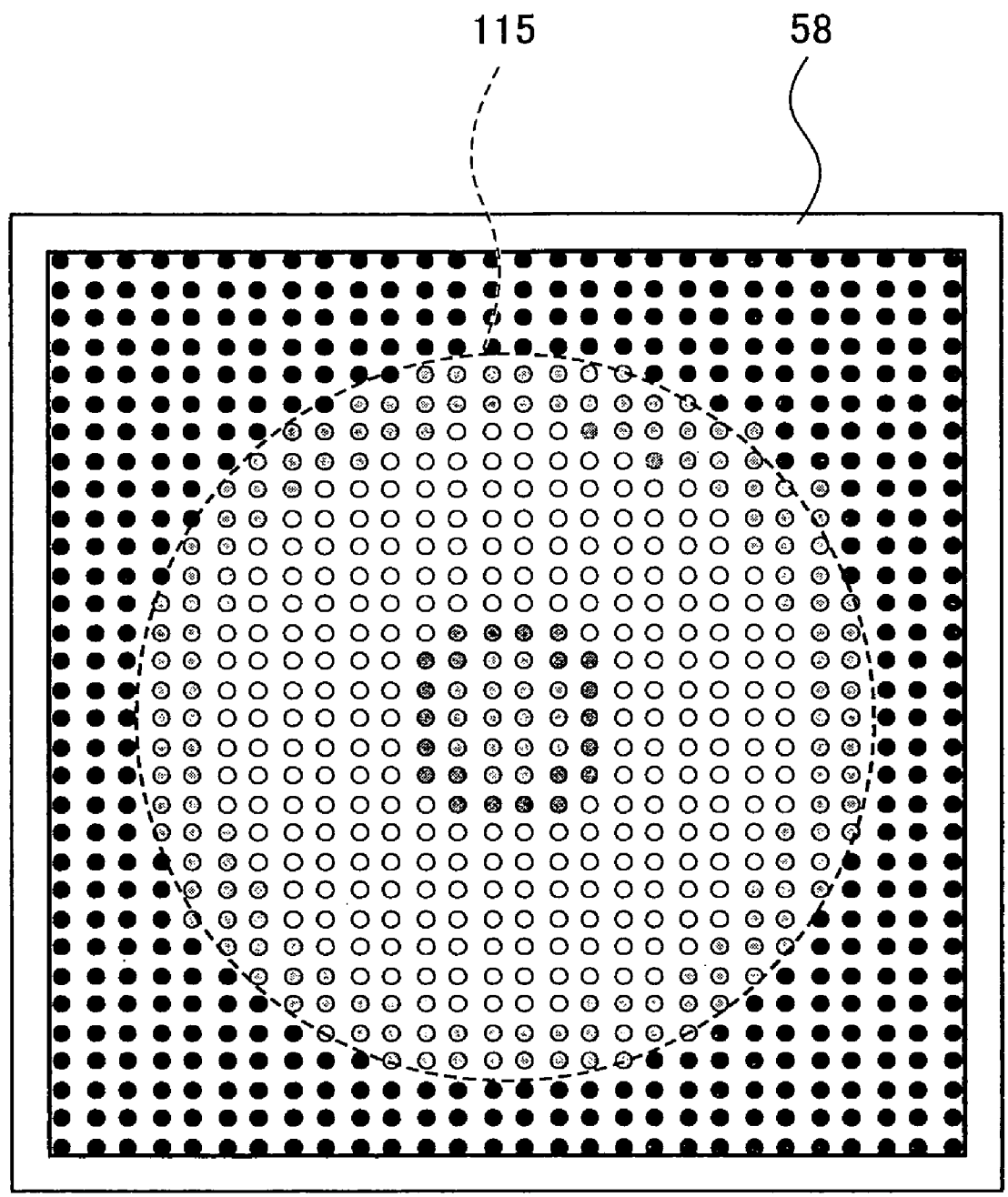
FIG. 14 is a diagram illustrating an example of the point-cloud data acquired by in-detail searching.

After carrying out either the processing of Step S. 6 or the processing of Step S. 9, the controller 6 proceeds to carry out the processing of in-detail target scanning. When the in-detail target scanning is carried out, the scanning in the vertical direction is carried out at the minimum scan pitch. The pitch for the scanning in the horizontal direction is, for example, the same as in the case of the rough scanning. This is because the turning in the horizontal direction has to be done by turning the main-body casing 27, and thus takes time. FIG. 14 shows point-cloud data thus acquired by the in-detail target scanning processing.

Step S.11 (Processing of Determining Center Coordinates)

Figure 15A:
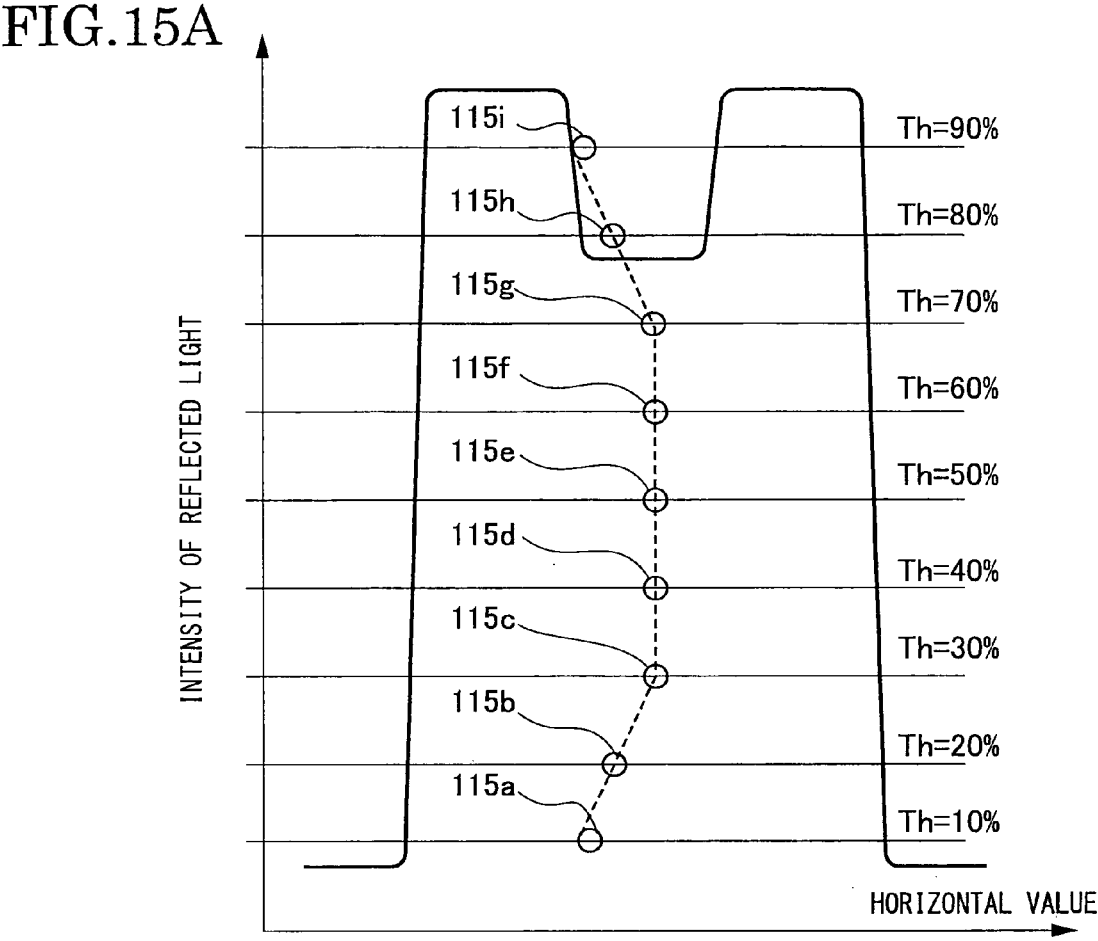
FIG. 15A is a distribution chart of the intensity of the reflected light for the point-cloud data in the X-direction of a scanning line shown in FIG. 15B.
Figure 15B:
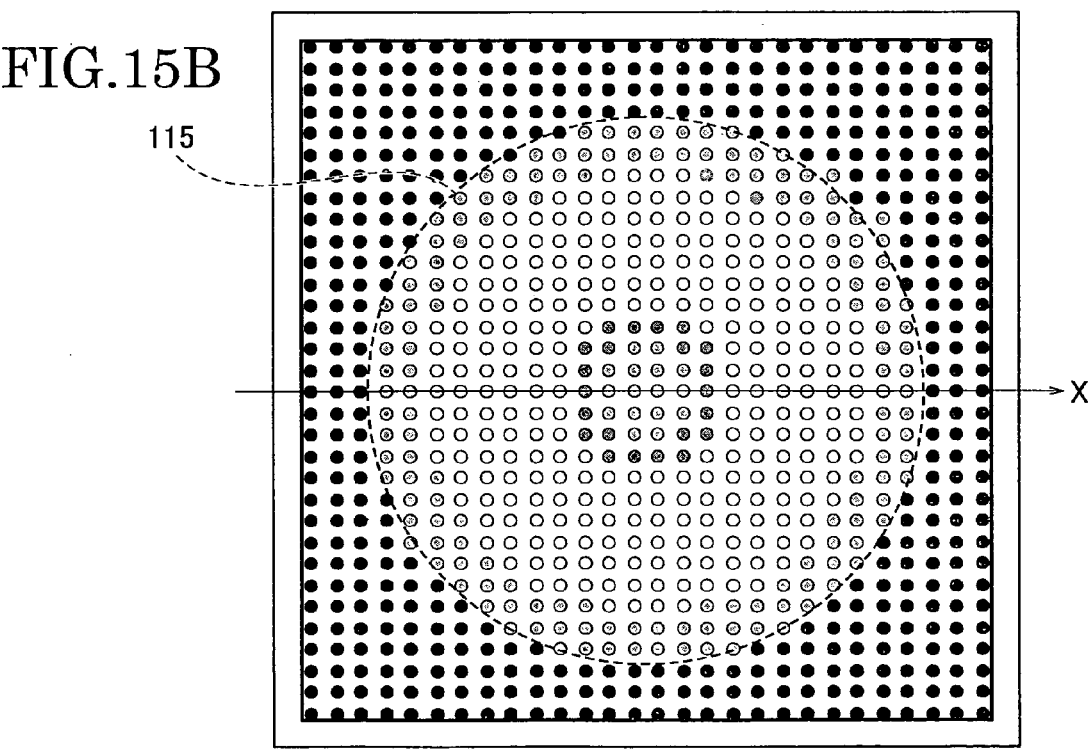
FIG. 15B is a diagram illustrating point-cloud data acquired by in-detail searching.
Figure 16:
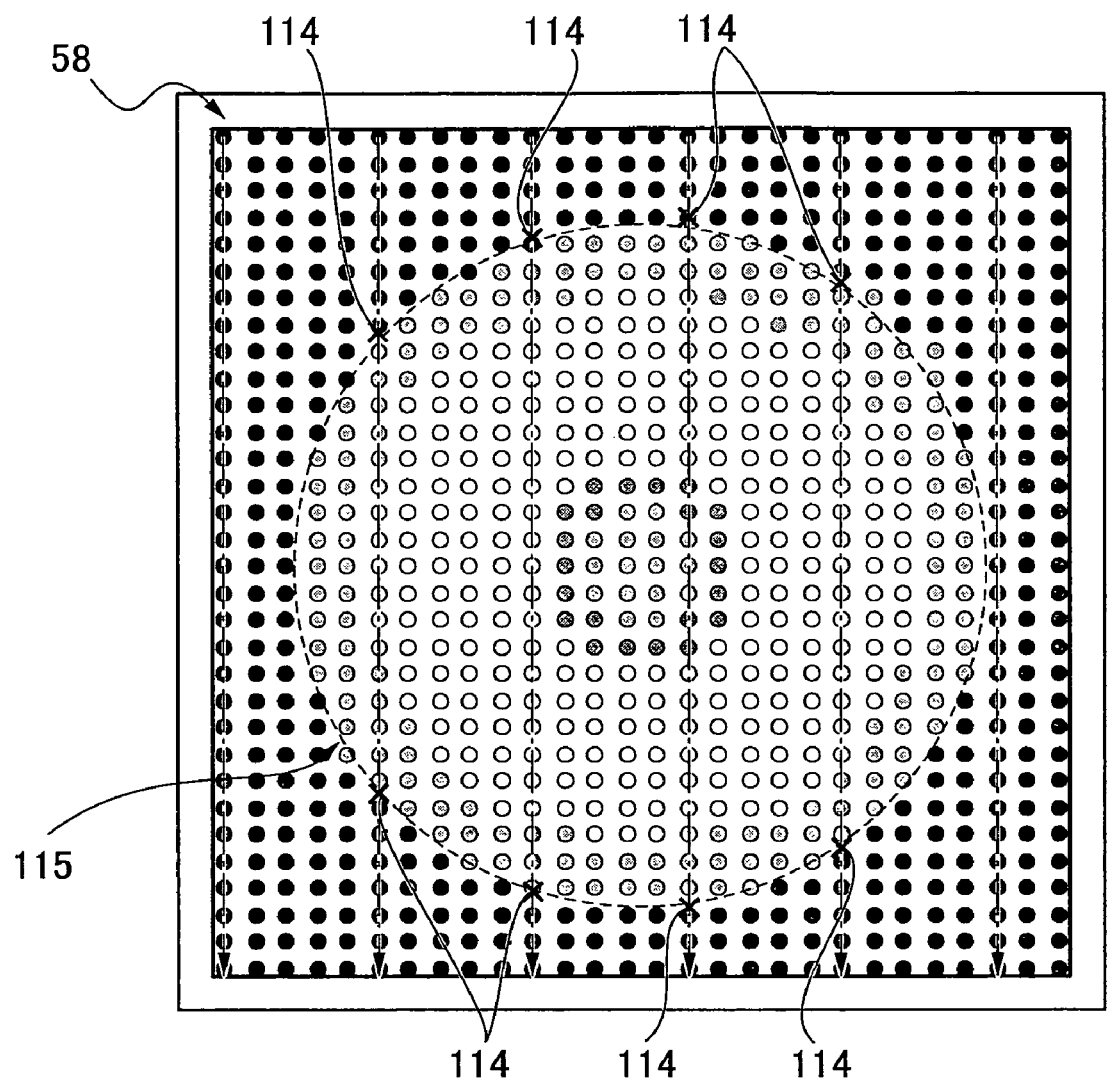
FIG. 16 is a diagram illustrating an example of the scanning performed on the point-cloud data shown in FIG. 14.

The controller 6 carries out, as FIG. 15G shows, the processing of ellipsoidal approximation by using the point-cloud data thus acquired. To begin with, the controller 6 divides the values of the reflected-light intensity of all the point-cloud data into ten levels—ranging from the minimum level to the maximum level. Thus set are nine threshold values ranging from 10% to 90%. Subsequently, as FIG. 16 shows, the point-cloud data is scanned in the vertical direction so as to detect the edge (the contour) as the border region between the low-luminance reflective region 110d and the high-luminance reflective region 110e. The reason for using the point-cloud data acquired by the scanning in the vertical direction is that the pieces of point-cloud data thus acquired by the scanning in the vertical direction are much more numerous than the pieces of point-cloud data acquired by the scanning in the horizontal direction. To put is differently, scanning the point-cloud data in the vertical direction can enhance the resolution of the edge detection. In FIG. 16, each point of the edges acquired by the scanning in the vertical direction is denoted by the reference numeral 114.

Subsequently, the controller 6 carries out the processing of ellipsoidal approximation on the basis of the points of the edges. The ellipsoidal approximation processing is carried out in accordance with the following general formula:

$$\frac{((x-x_0)\cos\phi + (y-y_0)\sin\phi)^2}{a^2} + \frac{((x-x_0)\sin\phi - (y-y_0)\cos\phi)^2}{b^2} - 1 = 0 \qquad \text{[Formula 1]}$$

In the formula given above, the symbol Ø represents the angle that each point makes with respect to the major-axis-direction line that passes on the center of the ellipsoid. The general formula can be rewritten by the following linear form:

$$Ax^2 + Bxy + Cy^2 + Dx + Ey + 1 = 0 \qquad \text{[Formula 2]}$$

In the formula given above, x represents the horizontal angle (H), and y represents the vertical angle (V). The controller 6 calculates the parameter coefficient for either A or E by using the least-square method.

Figure 17:
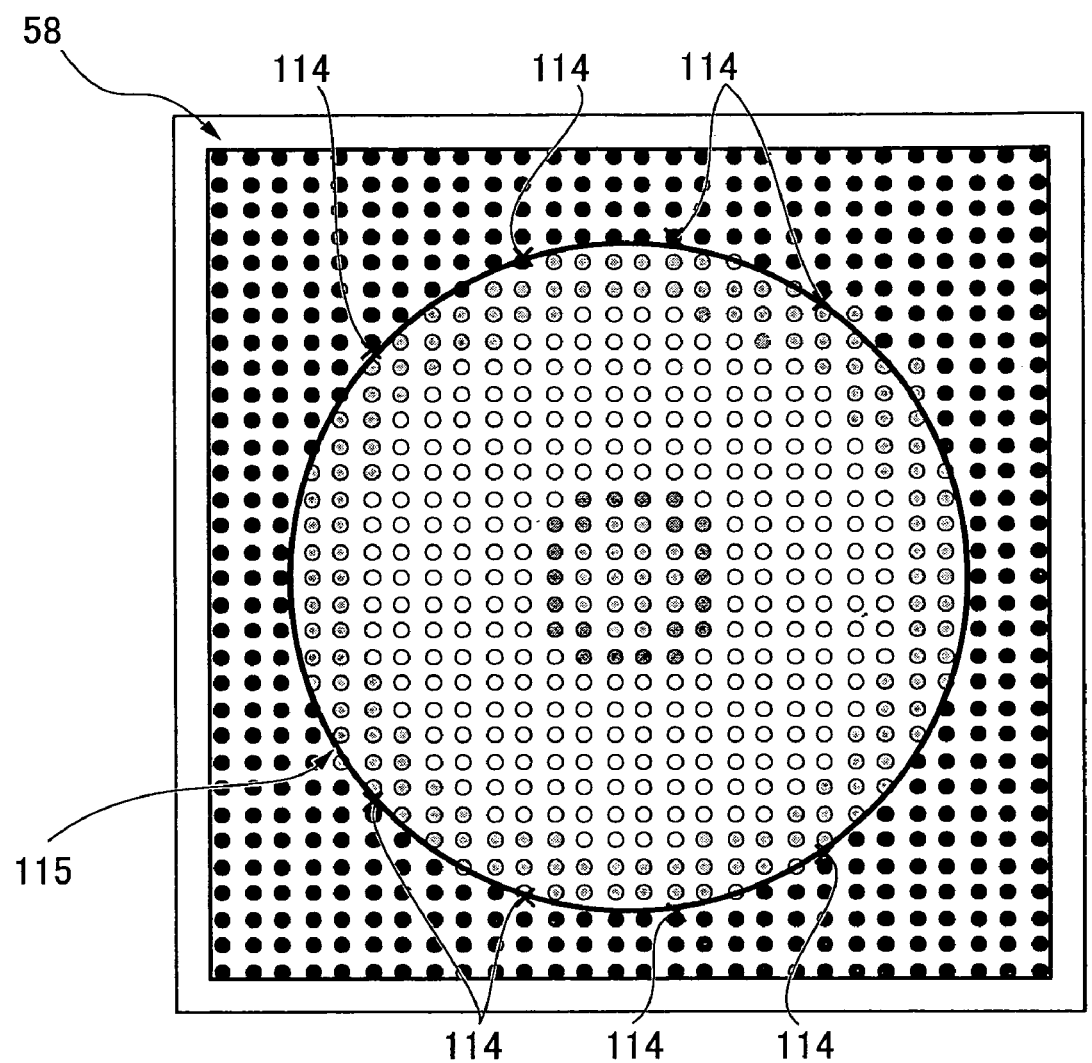
FIG. 17 is an example of an ellipsoid acquired by an ellipsoidal approximation processing and the central position of the ellipsoid thus acquired.

The controller 6 then obtains the center of an ellipsoid 115 in accordance with the following formula. FIG. 17 shows the ellipsoid 115 obtained by carrying out the processing of ellipsoidal approximation with the threshold level Th=10% and also shows the position of the center of the ellipsoid.

$$x_0 = \frac{BE - 2CD}{4AC - B^2} \quad \text{[Formula 3]}$$
$$y_0 = \frac{BD - 2AE}{4AC - B^2}$$

The processing of ellipsoidal approximation such as one described above is discretely repeated from the threshold level Th=20% to the threshold level Th=90%. Accordingly, as FIG. 15A shows, nine center positions 115a to 115i are calculated. The center position of the ellipsoid changes depending on the different threshold levels Th. Nevertheless, there is a threshold-level Th range that renders the deviation of the center positions small. The center-position coordinates of the target 110 is finally determined by using these threshold levels with the small deviation of the center positions. Specifically, in this embodiment, the center-position coordinate is determined by using the center positions of the threshold levels of the small deviation of the center positions, that is, the center positions of the threshold levels ranging from Th=30% to Th=70%.

Step S.12 (Checking Size of Target 110)

The size (diameter) of the target used in the measurement has been registered beforehand in the storage 62. After determining the center position of the ellipsoid 115, the controller 6 calculates the size (diameter) of the target 110. The controller 6 compares the registered size of the target 110 with the calculated size of the target 110. When the calculated size of the target 110 is not within a predetermined range, either the processing of Step S. 6 or the processing of Step S. 12 is repeatedly carried out. Note that the size (diameter) of the target is obtained by assigning, into a predetermined numerical formula, the center position, the major diameter, and the minor diameter which are calculated in the above-described way. Thus, whether the captured target is true or false can be checked.

Step S. 13 (Ranging Processing)

Subsequently, the controller 6 drives and controls the attenuator 39' so that the intensity of the reflected-light amount of the infrared pulse laser beam can be appropriate. Then, the controller 6 carries out the ranging multiple times on the basis of the received-light output of the ranging light-receiving unit 39, and acquires plural pieces of ranging data. The intermediate-luminance reflective region 110f of the target 110 has a lower luminance than the luminance of the high-luminance reflective region 110e, and thus a smaller amount of reflected light than the amount of reflected light of the high-luminance reflective region 110e. Accordingly, a favorably accurate value of ranging can be obtained.

The controller 6 converts the horizontal angle (H), the vertical angle (V), and the distance (D) of the center position of the target 110 into the three-dimensional coordinates for the public survey, and the resultant three-dimensional coordinates is stored in the storage 62.

Step S.14 (Determining Necessity of Continuing to Carry Out Processing of Acquiring Center Position of Next Target)

After the processing of Step S. 14 for the target of Number 001 is finished, the controller 6 returns back to Step S.6 and carries out the series of processing from Step S.6 to Step S.14 for the target of Number 002. The controller 6 carries out the series of processing from Step S. 6 to Step S. 14 for all the targets 110 and converts the horizontal angles (H), the vertical angles (V), and the distances (D) of the center positions of all the targets 110, which are calculated, into the three-dimensional coordinates for the public survey. The controller 6 stores the resultant three-dimensional coordinates in the storage 62.

Step S.15 (Carrying Out Main Scan)

The controller 6 then carries out the main scan for a scan area E1 of the to-be-measured object, and thus acquires multiple point-cloud data. The controller 6 converts the point-cloud data thus acquired with the center positions of the targets 110 being the reference positions.

Step S.16 (Combining Processing)

The controller 6 carries out the target searching scan and the main scan for the rest of the scanning areas. After finishing the target searching scan and the main scan, the controller 6 carries out the combining processing with the center positions of the targets 110 being the reference positions. The combining processing is carried out for each piece of the point-cloud data of the to-be-measured object 100. Through the series of processing described thus far, the coordinate values corresponding to the three-dimensional shape of the to-be-measured object 100 can be obtained. The processing of Step S.15 and the processing of Step S.16 are publicly known. Accordingly, no detailed description therefor will be given here.

On the basis of both the image acquired by the image light-receiving unit 43 and the three-dimensional coordinates acquired by the point-cloud data, the three-dimensional-shape measurement apparatus 1 can position the center position of the image and the center position of the point-cloud data so that the center positions can coincide with each other.

Note that the region of each of the targets 110 located between the large circle 110c and the small circle 110b is high-luminance reflective region 110e with the highest reflectivity. Accordingly, the approximate position of the target 110 can be acquired easily by searching.

In addition, when the approximate position of the target 110 is specified, the three-dimensional-shape measurement apparatus 1 can rely on any one of the following three methods. In a first method, the approximate position of the target 110 is specified by directly setting the sight at the target 110 by the sight 46. In a second method, the target 110 is specified by using the point-cloud data on the screen acquired by searching scanning. In a third method, after the digital image taken by the image light-receiving unit 43 is subjected to image processing, the resultant image is displayed on the screen, and the approximate position of the target 110 is specified by using the image displayed on the screen. Accordingly, the operability of the three-dimensional-shape measurement apparatus 1 can be improved.

The target according to the embodiment of the present invention is suitable for both cases where a reference position is detected through the laser scanning by a three-dimensional-shape measurement apparatus and where a reference position is detected from data on a taken image. In addition, the target can be made compact without reducing accuracy in measuring the coordinates of the center of the circular central region. Moreover, the circular central region can be used for ranging.

In addition, since a wide area can be secured for the high-luminance reflective portion, and since a great difference is set in the luminance between the high-luminance reflective region and the low-luminance reflective region, the searching for the target by the three-dimensional-shape measurement apparatus can be carried out quickly. Moreover, even when there is a high-luminance portion within the to-be-measured object, the target can be identified.

In addition, a sight can be easily set at the target.

The three-dimensional-shape measurement apparatus according to the embodiment of the present invention is capable of quickly searching for the target and determining the center position coordinates of the target. Moreover, since the center coordinates of the target is determined by an ellipsoidal approximation process, the center position of the target can be determined accurately even in the case of measuring the target obliquely.

In addition, the accuracy in acquiring the coordinates of the center position of the target can be increased.

In addition, the accuracy in acquiring the edge region of the target can be increased.

In addition, the resolution at which the point-cloud data is acquired can be increased. Moreover, the point-cloud data can be scanned in a shorter length of time.

In addition, whether or not the would-be target is a true target can be checked.

In addition, an appropriate target can be used in accordance with the distance between the three-dimensional-shape measurement apparatus and the to-be-measured object.

In addition, both the image and the point can be measured by positioning the center position of the image and the center position of the point-cloud data so that the center positions can coincide with each other, on the basis of the image acquired by the image light-receiving portion and the three-dimensional coordinates acquired by the point-cloud data.

An embodiment of the present invention has been described thus far in detail with reference to the drawings. However, the embodiment is only an exemplar configuration of the present invention, and is not the only configuration of the present invention at all. Accordingly, a configuration that includes various changes in design still remains within the scope of the present invention as long as the changes do not depart from the gist of the present invention.

What is claimed is:

1. A three-dimensional-shape measurement apparatus comprising:
    a light-emitting unit emitting a pulse-laser beam towards a to-be-measured object provided with a target set in the to-be-measured object and used for acquiring a reference value of point-cloud data, the target including
        (i) a small circle surrounded by a frame and having the center of the target,
        (ii) a large circle surrounded by the frame and disposed concentrically with the small circle so as to surround the small circle,
        (iii) a low-luminance reflective region located between the frame and the large circle and having the lowest reflectivity,
        (iv) a high-luminance reflective region located between the large circle and the small circle and having the highest reflectivity, and
        (v) an intermediate-luminance reflective region located inside the small circle and having an intermediate reflectivity which is higher than the reflectivity of the low-luminance reflective region and which is lower than the reflectivity of the high-luminance reflective region;
    a first drive unit scanning the to-be-measured object in a horizontal direction;
    a second drive unit scanning the to-be-measured object in a vertical direction;
    a controller calculating the coordinates of the center of the target and thus the distance between the three-dimensional-shape measurement apparatus and the target by the scanning in the horizontal and vertical directions, calculating the three-dimensional coordinates of the center of the target, and carrying out processing of combining point-cloud data acquired by scanning the to-be-measured object on the basis of the calculated three-dimensional coordinates of the center position of the target; and
    an image light-receiving unit taking an image of the to-be-measured object,
    wherein the controller carries out:
        a target-searching process of scanning a searching area of the to-be-measured object with the pulse-laser beam, and searching for the target on the basis of point-cloud data including a reflected laser beam obtained from each point of the to-be-measured object and a reflected laser beam obtained from each point of target;
        a capturing process of specifying a target searching area on the basis of the point-cloud data acquired at the target-searching process, and capturing an approximate position of the target on the basis of point-cloud data acquired by scanning the specified target searching area;
        a detailed searching process of performing in-detail searching of the target on the basis of the approximate position of the target acquired in the capturing process, and acquiring point-cloud data;
        a center-coordinate determination process of extracting an edge between a high-luminance reflective region and a low-luminance reflective region of the target on the basis of the intensity of a reflected laser beam of the point-cloud data acquired in the detailed searching process, and obtaining the coordinates of the center of the target by an ellipsoidal-approximation process; and
        a ranging process of measuring the distance between the three-dimensional-shape measurement apparatus and the target, and
    wherein a plurality of targets to be used having different sizes are prepared in accordance with the distance between three-dimensional-shape measurement apparatus and the to-be-measured object.

2. The three-dimensional-shape measurement apparatus according to claim 1, wherein the controller sets a plurality of threshold levels for the intensity of the reflected laser beam of the point-cloud data acquired in the detailed searching process; and determines the coordinates of the center of the target by using, among sets of center coordinates of a plurality of ellipsoids obtained by carrying out ellipsoidal approximation process for each of the threshold levels, a set of center coordinates having a small deviation.

3. The three-dimensional-shape measurement apparatus according to claim 2, wherein the controller acquires the point-cloud data in the capturing process by attenuating, by a predetermined proportion, the reflected laser beam coming from the to-be-measured object, and then by carrying out the capturing process again.

4. The three-dimensional-shape measurement apparatus according to claim 3, wherein the controller acquires the point-cloud data in the capturing process by measuring the distance between the three-dimensional-shape measurement apparatus and the target, and then by carrying out the capturing process while the controller changes the beam-spot diameter of the pulse-laser beam on the basis of the distance-measurement result.

5. The three-dimensional-shape measurement apparatus according to claim 4, wherein the controller extracts the edge by scanning the point-cloud data in a vertical direction.

6. The three-dimensional-shape measurement apparatus according to claim 5, wherein the controller checks whether or not the would-be target acquired by the in-detail searching is a true target by comparing the size of the would-be target with that of the target having been registered beforehand.

7. The three-dimensional-shape measurement apparatus according to claim 1, wherein, on the basis of an image obtained by the image light-receiving unit and the three-dimensional coordinates obtained from the point-cloud data, the controller positions a center position of the image and a center position of the point-cloud data so that the center positions coincide with each other.

8. The three-dimensional-shape measurement apparatus according to claim 1, wherein a mark having a reflectivity that is approximately the same as the reflectivity of the low-luminance reflective region is formed at the center of the target inside the small circle.

9. The three-dimensional-shape measurement apparatus according to claim 8, wherein a mark having a reflectivity that is approximately the same as the reflectivity of the intermediate-luminance reflective region is formed at the center of each side of the frame.

10. The three-dimensional-shape measurement apparatus according to claim 1, wherein a mark having a reflectivity that is approximately the same as the reflectivity of the intermediate-luminance reflective region is formed at the center of each side of the frame.

11. The three-dimensional shape measurement apparatus according to claim 1, wherein each of the plurality of targets includes:

a small circle surrounded by a frame and having the center of the target;

a large circle surrounded by the frame and disposed concentrically with the small circle so as to surround the small circle;

a low-luminance reflective region located between the frame and the large circle and having the lowest reflectivity;

a high-luminance reflective region located between the large circle and the small circle and having the highest reflectivity;

an intermediate-luminance reflective region located inside the small circle and having an intermediate reflectivity which is higher than the reflectivity of the low-luminance reflective region and which is lower than the reflectivity of the high-luminance reflective region;

a mark having a reflectivity that is approximately the same as the reflectivity of the low-luminance reflective region at the center of the target inside the small circle; and a mark having a reflectivity that is approximately the same as the reflectivity of the intermediate-luminance reflective region at the center of each side of the frame.

* * * * *